United States Patent
Shu et al.

(10) Patent No.: US 12,394,220 B2
(45) Date of Patent: Aug. 19, 2025

(54) SYSTEMS AND METHODS FOR ATTENTION MECHANISM IN THREE-DIMENSIONAL OBJECT DETECTION

(71) Applicant: Salesforce, Inc., San Francisco, CA (US)

(72) Inventors: Manli Shu, Greenbelt, MD (US); Le Xue, Mountain View, CA (US); Ning Yu, Palo Alto, CA (US); Roberto Martín-Martín, Austin, TX (US); Juan Carlos Niebles Duque, Mountain View, CA (US); Caiming Xiong, Menlo Park, CA (US); Ran Xu, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 318 days.

(21) Appl. No.: 18/161,661

(22) Filed: Jan. 30, 2023

(65) Prior Publication Data
US 2024/0169746 A1    May 23, 2024

Related U.S. Application Data

(60) Provisional application No. 63/383,240, filed on Nov. 10, 2022.

(51) Int. Cl.
*G06V 20/64* (2022.01)
*G06T 3/4007* (2024.01)
(Continued)

(52) U.S. Cl.
CPC ............ *G06V 20/64* (2022.01); *G06T 3/4007* (2013.01); *G06V 10/46* (2022.01); *G06V 10/82* (2022.01)

(58) Field of Classification Search
CPC ........ G06V 20/64; G06V 10/82; G06V 10/46; G06T 3/4007
(Continued)

(56) References Cited

U.S. PATENT DOCUMENTS

2020/0302214 A1* 9/2020 Arani .................. G06V 10/454

OTHER PUBLICATIONS

Dai, et al., "Scan Net: Richly-Annotated 3D Reconstructions of Indoor Scenes", arXiv:1702.04405v2 [cs.CV], Apr. 1, 2017, 22 pages.
(Continued)

*Primary Examiner* — Michael R Neff
(74) *Attorney, Agent, or Firm* — Haynes and Boone, LLP

(57) ABSTRACT

Embodiments described herein provide a system for three-dimensional (3D) object detection. The system includes an input interface configured to obtain 3D point data describing spatial information of a plurality of points, and a memory storing a neural network based 3D object detection model having an encoder and a decoder. The system also includes processors to perform operations including: encoding, by the encoder, a first set of coordinates into a first set of point features and a set of object features; sampling a second set of point features from the first set of point features; generating, by attention layers at the decoder, a set of attention weights by applying cross-attention over at least the set of object features and the second set of point feature, and generate, by the decoder, a predicted bounding box among the plurality of points based on at least in part on the set of attention weights.

20 Claims, 14 Drawing Sheets

(51) Int. Cl.
*G06V 10/46* (2022.01)
*G06V 10/82* (2022.01)

(58) Field of Classification Search
USPC .......................................................... 382/181
See application file for complete search history.

(56) References Cited

OTHER PUBLICATIONS

Liu, et al., "Group-Free 3D Object Detection Via Transformers", arXiv:2104.00678v2 [cs.CV], Apr. 23, 2021, 14 pages.
Misra, et al. "An End-to-End Transformer Model for 3d Object Detection", arXiv:2109.08141v1 [cs.CV], Sep. 16, 2021, 15 pages.
Qi, et al, "Deep Hough Voting for 3D Object Detection in Point Clouds", arXiv:1904.09664v2 [cs.CV], 2019, 14 pages.
Qi, et al., "PointNet++: Deep Hierarchical Feature Learning on Point Sets in a Metric Space", arXiv:1706.02413v1 [cs.CV], Jun. 7, 2017, 14 pages.
Shi, et al., "PointRCNN: 3D Object Proposal Generation and Detection from Point Cloud", arXiv:1812.04244v2 [cs.CV], May 16, 2019, 10 pages.
Song, et al., "SUN RGB-D: A RGB-D Scene Understanding Benchmark Suite", Proceedings of 28th IEEE Conference on Computer Vision and Pattern Recognition (CVPR2015), 10 pages.

\* cited by examiner

| Methods | #Params | Backbone | ScanNet V2 | |
|---|---|---|---|---|
| | | | mAP@0.25 | mAP@0.50 |
| VoteNet | - | PointNet++ | 62.9 | 39.9 |
| H3DNet | - | PointNet++ | 64.4 | 43.4 |
| H3DNet | - | 4×PointNet++ | 67.2 | 48.1 |
| 3DETR | - | transformer | 65.0 | 47.0 |
| Pointformer | - | transformer | 64.1 | 42.6 |
| Group-Free[72,256] | 13.0M | PointNet++ | 67.3 (66.3) | 48.9 (48.5) |
| w/ MS + Local (Ours) | 15.0M | PointNet++ | 67.9 (67.1) (↑ 0.8) | 51.4 (49.8) (↑ 2.5) |
| RepSurf-U[6,256] | 13.1M | PointNet++ | 68.8 ( - ) | 50.5 ( - ) |
| RepSurf-U[6,256] (reproduce) | 13.1M | PointNet++ | 68.0 (67.4) | 50.2 (48.7) |
| w/ MS + Local (Ours) | 15.1M | PointNet++ | 69.5 (68.8) (↑ 1.5) | 52.5 (51.1) (↑ 2.3) |
| Group-Free[72,512] | 26.9M | PointNet++w2x | 69.1 (68.6) | 52.8 (51.8) |
| w/ MS + Local (Ours) | 28.9M | PointNet++w2x | 70.3 (69.2) (↑ 1.2) | 54.6 (53.2) (↑ 1.8) |
| RepSurf-U[12,512] | 27.1M | PointNet++w2x | 71.2 ( - ) | 54.8 ( - ) |
| RepSurf-U[12,512] (reproduce) | 27.1M | PointNet++w2x | 70.8 (70.2) | 54.4 (53.6) |
| w/ MS + Local (Ours) | 29.1M | PointNet++w2x | 71.7 (71.0) (↑ 0.9) | 56.5 (54.8) (↑ 2.1) |

FIG. 8A

| Methods | mAP@0.25 | mAP@0.50 |
|---|---|---|
| VoteNet | 59.1 | 35.8 |
| H3DNet | - | - |
| H3DNet | 60.1 | 39.0 |
| 3DETR | 59.1 | 32.7 |
| Pointformer | 61.1 | 36.6 |
| Group-Free[72,256] | 63.0 (62.6) | 45.2 (44.4) |
| w/ MS + Local (Ours) | 63.8 (63.2) (↑ 0.8) | 46.6 (45.7) (↑ 1.4) |
| RepSurf-U[6,256] | 64.3 ( - ) | 45.9 ( - ) |
| RepSurf-U[6,256] (repd.) | 64.0 (63.3) | 45.7 (45.2) |
| w/ MS + Local (Ours) | 64.5 (63.8) (↑ 0.5) | 47.5 (46.1) (↑ 1.8) |

FIG. 8B

| MS-A | Local-A | mAP$_S$ | mAP$_M$ | mAP$_L$ |
|---|---|---|---|---|
| - | - | 63.1 | 76.6 | 83.2 |
| ✓ | - | 65.0 | 77.5 | 83.9 |
| - | ✓ | 65.2 | 78.6 | 83.9 |
| ✓ | ✓ | 65.6 (↑ 2.5) | 79.0 (↑ 2.4) | 84.3 (↑ 1.1) |

FIG. 8C

| MS-A | Local-A | mAP@0.25 | mAP@0.50 |
|---|---|---|---|
| - | - | 68.6 | 51.8 |
| ✓ | - | 68.9 | 52.5 |
| - | ✓ | 68.9 | 52.9 |
| ✓ | ✓ | 69.2 | 53.2 |

FIG. 8D

| $N_{local}$ | mAP@0.25 | mAP@0.50 | $mAP_S$ | $mAP_M$ | $mAP_L$ |
|---|---|---|---|---|---|
| 8 | 67.8 | 51.1 | 64.6 | 78.0 | 82.8 |
| 16 | 68.9 | 52.9 | 65.2 | 78.6 | 83.9 |
| 24 | 68.9 | 53.0 | 65.4 | 78.5 | 84.0 |
| 32 | 68.3 | 52.1 | 64.7 | 77.8 | 84.3 |

*FIG. 8F*

| Feature Scales $s$ | mAP@0.25 | mAP@0.50 |
|---|---|---|
| [1×] | 68.6 | 51.8 |
| [1×, 2×] | 68.9 | 52.5 |
| [0.5×, 1×, 2×] | 67.9 | 51.7 |

*FIG. 8G*

SYSTEMS AND METHODS FOR ATTENTION MECHANISM IN THREE-DIMENSIONAL OBJECT DETECTION

CROSS REFERENCE(S)

The instant application is a nonprovisional of and claim priority under 35 U.S.C. 119 to U.S. provisional application No. 63/383,240, filed Nov. 10, 2022, which is hereby expressly incorporated by reference herein in its entirety.

TECHNICAL FIELD

The embodiments relate generally to machine learning systems, and more specifically to systems and methods for attention mechanism in three-dimensional (3D) object detection.

BACKGROUND 3D point cloud data provides accurate geometric and spatial information of objects, which are important to computer vision applications such as autonomous driving, 3D-printing, radiology, augmented reality, and/or the like. Machine learning using Transformer networks is widely used in 3D object detection. However, 3D point cloud often includes unordered irregular points, which leads to inaccuracies in 3D object detection using existing Transformer networks.

Therefore, there is a need for improved 3D learning models that accurately learn the features from the 3D point cloud data.

BRIEF DESCRIPTION OF THE DRAWINGS

FIGS. 8A-8G provides charts illustrating exemplary performance of different embodiments described herein.

Figure 1A:
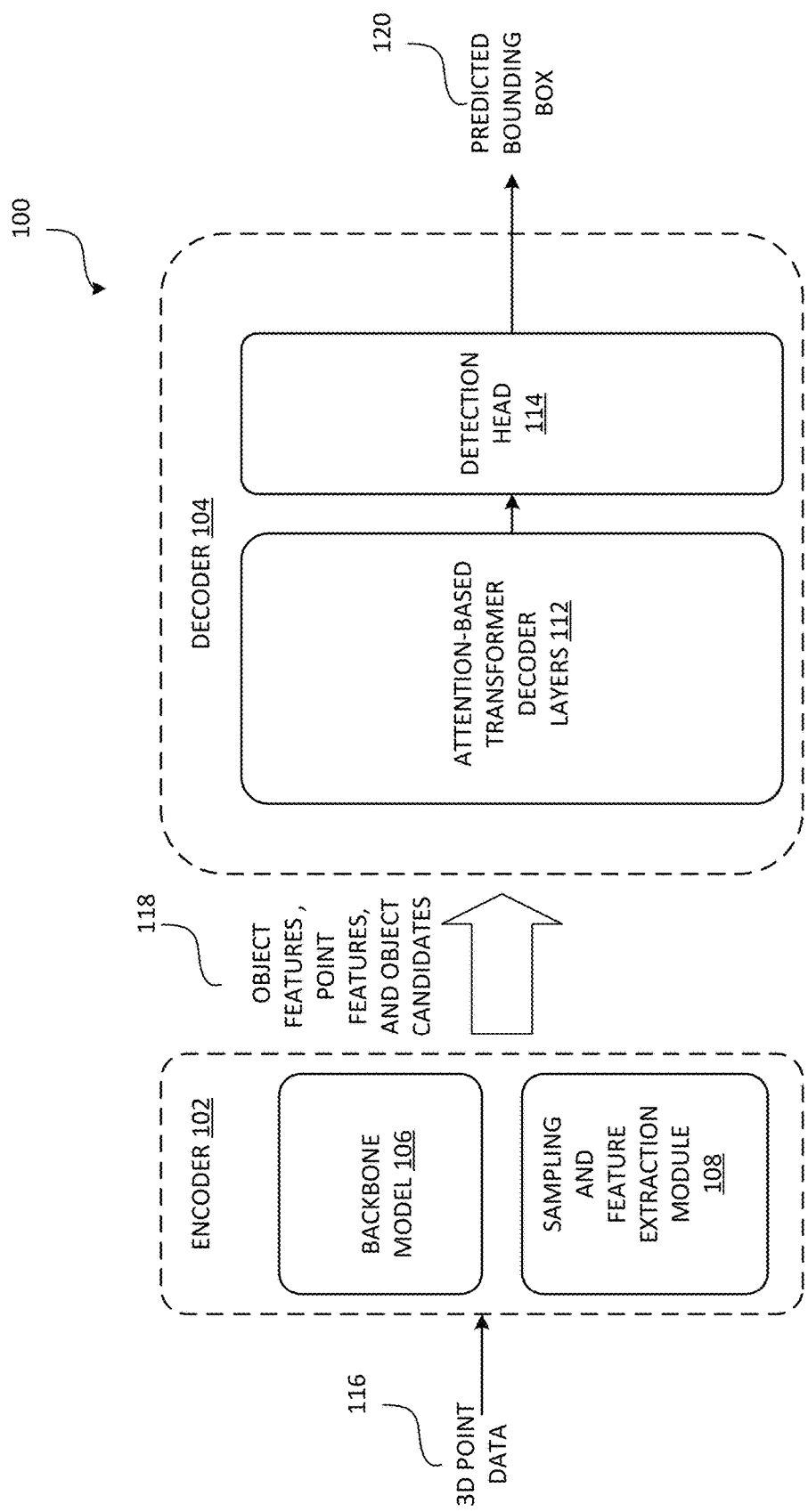
FIG. 1A is a simplified diagram illustrating an exemplary 3D object detection framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Transformers have been used in 3D point cloud object detection for predicting 3D bounding boxes that represent objects in a scene. The attention mechanism of transformers enable the modeling of long-range relationships that help capture the global context for point cloud learning. However, the lack of hierarchy in an existing transformer architecture makes it difficult for the existing Transformers to learn features at different scales and extract localized features. Such limitation results in imbalanced performance in transformers on objects of different sizes, e.g., smaller objects. For example, to make the computation feasible, an existing Transformer-based 3D object detector often uses point cloud features consisting of a smaller set of points compared to the original point cloud. The downsampled point cloud loses geometric details, which have a larger impact on small objects. Also, an existing Transformer extract features at the global scale throughout the network, and often does not support explicit localized feature learning.

In view of the need for 3D learning models on learning features at different scales and local feature extraction, embodiments described herein provide a 3D object detection framework having model-agnostic cross-attention modules that can be combined with any 3D object detection head for 3D detection tasks. Specifically, the 3D object detection framework includes an encoder and a decoder. The encoder encodes input 3D point data into point features. The decoder includes attention-based transformer decoder layers that generate sampled point features from the point features and compute attention scores based on the sampled point features and the input point features. The attention scores are thus input to a detection head to generate a predicted bounding box that represents an object in a scene. The attention-based transformer decoder layer may include one or more multi-scale attention layers, one or more size-adaptive local attention layers, or a combination of both (e.g., a number of multi-scale attention layers followed by one or more self-adaptive local attention layers). Using this hierarchical learning design, the multi-scale attention layer may allow feature learning at different scales, and the size-adaptive local attention layer may perform extraction of localized features for bounding box prediction.

In one embodiment, a multi-scale attention layer creates a set of upsampled point features that includes more points than the input point features, and performs cross-attention respectively between the input object features and the point features, and between the object features and the upsampled point features. The multi-scale attention layer then concatenate attention weights generated from the cross-attentions to obtain concatenated attention weights for updating the object features. A size-adaptive local attention layer predicts an intermediate bounding box proposal and creates a set of sampled point features using the intermediate bounding box proposal and the input point features. The size-adaptive local attention layer then truncate and/or pad the tokens of the sampled point features to have the same length, and perform cross-attention between the object features and the sampled point features, generating the attention weights for updating the object features. The updated object features can be the input for the next cross-attention layer (e.g., a multi-scale attention layer or a size-adaptive local attention layer).

Embodiments described herein provide a number of benefits. For example, the disclosed Transformer learns features in a hierarchical manner by generating sampled point features from the input, and performs cross-attention using the sampled point features. The use of such hierarchical structure improves the feature learning at different scales or at a localized object-level, making the framework more suitable for 3D object detection. For example, the multi-scale attention mechanism builds higher resolution point features from the single-scale input feature using learnable upsampling strategy. The higher resolution point features can provide more geometric details of the objects, improving the global learning of the objects. The Size-Adaptive Local Attention mechanism enables more efficient local feature learning by predicting intermediate bounding box proposals and updating the object features based on the space confined by the intermediate bounding box. Local features can be more efficiently and accurately learned by the disclosed framework.

Overview

FIG. 1A is a simplified diagram illustrating a 3D object detection framework 100 according to some embodiments. 3D object detection framework 100 may be a Transformer. 3D object detection framework 100 comprises an encoder 102 and a decoder which is operatively connected to encoder 102. 3D object detection framework 100 may have 3D point data 116 as input, and may output one or more predicted bounding boxes 120. 3D point data 116 may include the 3D coordinate of each point in a plurality points, which can be a subset of a set of raw 3D point data. In some embodiments, 3D point data 116 contains information (e.g., geometric information, location information, appearance information, etc.) describing one or more objects in a scene. Predicted bounding boxes 120 may represent/simulate the objects in the scene, e.g., showing the locations, sizes, and/or orientations of the objects.

3D point data 116 may be the input data of 3D object detection framework 100 (or encoder 102). 3D point data 116 may be obtained as a subset of raw point cloud $\mathcal{P}_{raw}$ having a set of P points $\mathcal{P} = \{p_i\}_{i=1}^{P}$. Each point $p_i \in \mathbb{R}^3$ is represented by its 3-dimensional coordinate. Point cloud $\mathcal{P}_{raw}$ may include information used for predicting a set of bounding boxes for the objects in a scene. The information may include the location (e.g., the center of a bounding box), size, and orientation of a bounding box. In an example, 3D point data 116 may contain aggregated groups of points and can be downsampled from point cloud $\mathcal{P}_{raw}$ to a set of N points, by $\mathcal{P} = SA(\mathcal{P}_{raw}) = \{p_i\}_{i=1}^{N}$ (N<<P), where SA (set abstraction) is the aggregation function. The 3D point data 116, as a set of the group centers, can be sampled from point cloud $\mathcal{P}_{raw}$ using a sampling tool (e.g., a random sampling algorithm) such as Furthest Point Sample (FPS) described by Charles Ruizhongtai Qi et al. (Pointnet: Deep Learning On Point Sets For 3D Classification And Segmentation (Charles Ruizhongtai Qi, Hao Su, Kaichun Mo, and Leonidas J. Guibas, In CVPR, 2017).

Encoder 102 may encode the 3-dimensional coordinates of 3D point data 116 into features. As shown in FIG. 1A, encoder 102 may include a backbone model 106 that encodes 3D point data 116 into a set of point features $\{z_i\}_{i=1}^{N}, z_i \in \mathbb{R}^d$, where d is the feature dimension. Backbone model 106 is described by Charles Ruizhongtai Qi et al. (Pointnet++: Deep Hierarchical Feature Learning On Point Sets In A Metric Space, In NIPS, 2017, Charles Ruizhongtai Qi, Li Yi, Hao Su, and Leonidas J. Guibas). Encoder 102 may also include a sampling and feature extraction module 108 that samples M initial object candidates from 3D point data 116 and encode the M initial object candidates into object features $\{q_i\}_{i=1}^{M}, q_i \in \mathbb{R}^C$, M being less than or equal to N. The M initial object candidates may be the object centers determined by sampling and feature extraction module 108. In some embodiments, FPS is used to sample the M initial object candidates. Thus, encoder 102 may an output 118 that includes a set of object features (e.g., $\{q_i\}_{i=1}^{M}$), a set of point features ($\{z_i\}_{i=1}^{N}$, and the 3-dimensional coordinates of the M initial object candidates to decoder 104. In some embodiments, the set of object features and the set of point features are the same, e.g., M is equal to N. In some embodiments, backbone model 106 and sampling and feature extraction module 108 can be one (e.g., the same) model/module.

Decoder 104 may perform attention based on the set of object features and set of point features to generate a set of attention weights for predicting bounding boxes that represent the objects in the scene. As shown in FIG. 1A, decoder 104 includes one or more attention-based transformer decoder layers 112 that include one or more self-attention layers and one or more cross-attention layers. Decoder 104 may also include a detection head 114. The one or more self-attention layers may perform self-attention amongst the M initial object candidates (e.g., amongst the set of object features $\{q_i\}_{i=1}^{M}$) and output updated object features to one or more cross-attention layers. The one or more cross-attention layers may perform cross-attention between the object candidates (e.g., the set of object features from self-attention layers) and point features. The point features may include the set of output point features in output 118 and/or a set of sampled point features. The sampled point features can be computed based on the point features in output 118 and/or the object features from encoder 102. Details of the cross-attention by attention-based transformer decoder layers 112 are described in below. Detection head 114 may predict the parameters of the bounding box for each of the M object candidates based on the attention weights generated in attention-based transformer decoder layers 112. The parameters may include the box location (box center) $\hat{c} \in \mathbb{R}^3$, size (H/W/D dimensions) $\hat{d} \in \mathbb{R}^3$, orientation (heading angles) $\hat{a} \in \mathbb{R}^3$, and the semantic label of the object g. With these parameterizations, detection head 114 may generate a predicted bounding box 120 as $\hat{b} = \{\hat{c}, \hat{d}, \hat{a}, \hat{s}\}$. In some embodiments, detection head 114 includes a classification head, a regression head, and/or the like.

The attention mechanism can be expressed as $$Attn(Q, K, V) = softmax\left(\frac{QK^T}{\sqrt{d_h}}\right)V, \qquad (1)$$

where the attention function takes in query (Q), key (K), and value (V) as the input. The output of the attention function is a weighted sum of the value with the attention weight being the scaled dot-product between the key (K) and the query (Q), $d_h$ being the hidden dimension of the attention layer. For self-attention, $Q=T^{l-1}W_Q^l$, $K=T^{l-1}W_K^l$, $V=T^{l-1}W_V^l$, where $T^{l-1} \in \mathbb{R}^{N \times d_h}$ is the output of the previous $(l-1)^{th}$ transformer layer, and the parameter matrices are $W_i^Q \in \mathbb{R}^{d \times d_h}$, $W_i^K \in \mathbb{R}^{d \times d_h}$, and $W_i^V \in \mathbb{R}^{d \times d_v}$. For cross-attention, Q, K, and V can have different sources and the details are described as follows.

In some embodiments, decoder 104 employs multi-head attention in each attention layer to generate the set of attention weights. Multiple attention functions are applied in parallel across different attention heads. The input of each attention head is a segment of the attention layer's input. Specifically, the query (Q), key (K), and value (V) are split along the hidden dimension into $(Q_i, K_i, V_i)_{i=1}^h$, with $$Q_i \in \mathbb{R}^{d_h/h}, K_i \mathbb{R}^{d_h/h}, V_i \in \mathbb{R}^{d_v/h},$$

where h is the number of attention heads. The final output of the multi-head attention layer is the projection of the concatenated outputs of all attention heads:

$$\text{MultiHead}(Q,K,V)=\text{Concat}(\{\text{Attn}(Q_0,K_0,V_0); \ldots ;\text{Attn}(Q_{h-1},K_{h-1},V_{h-1})\})W^O, \quad (2)$$

where MultiHead (Q, K, V) denotes the concatenation of the output and $W^O$ is the output projection matrix.

Figure 1B:
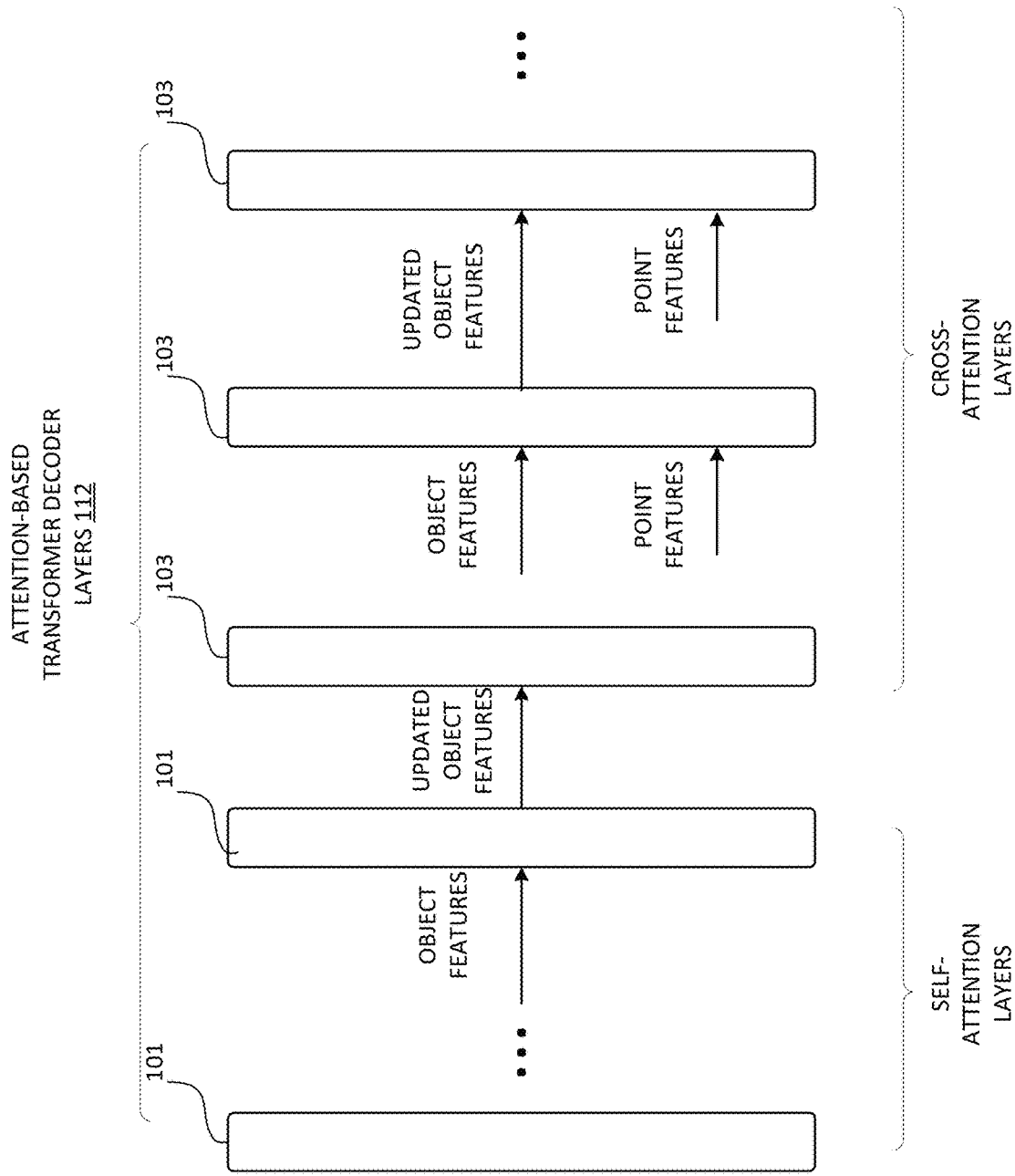
FIG. 1B illustrates a configuration of attention layers in the 3D object detection framework shown in FIG. 1A, according to some embodiments.

FIG. 1B illustrates a detailed diagram of one configuration of attention-based transformer decoder layers 112 shown in FIG. 1A. As shown in FIG. 1B, attention-based transformer decoder layers 112 include one or more self-attention layers 101 and a plurality of cross-attention layers 103, each being referred to as an attention-based transformer decoder layer. The one or more self-attention layers 101 and the plurality of cross-attention layers 103 may be coupled in cascade, with the one or more self-attention layers 101 arranged before the plurality of cross-attention layers 103. The input of each self-attention layer 101 may be a set of object features and the output may be a set of updated object features. The input of each cross-attention layer 103 includes a set of object features and a set of point features, and the output of cross-attention layer 103 includes updated object features, which is fed into the next cross-attention layer 103 as input. In some embodiments, the point features, as part of the input of cross-attention layer 103, may be the point feature in output 118.

In various embodiments, the cross-attention layers 103 may include one or more of multi-scale attention layers, and/or one or more of size-adaptive local attention layers. A multi-scale attention layer may build a set of higher resolution point features from the set of single-scale input features with a learnable upsampling strategy and use both sets of point features in the attention function. A size-adaptive local attention layer may learn localized object-level features for each object candidate and adjusts attention regions to object candidates depending on the sizes of the respective bounding box proposals. The details of the two attention layers are described in FIGS. 2 and 3. FIG. 1D illustrates possible combination of multi-scale attention layers and size-adaptive local attention layers in the cross-attention layers. For example, the cross-attention layers may include (a) all (e.g., only) multi-scale attention layers, (b) all size-adaptive local attention layers, or (c) a combination of multi-scale attention layers and size-adaptive local attention layers. In an embodiment, decode 104 may include a size-adaptive local attention as the last cross-attention layer and one or more multi-scale attentions before the size-adaptive local attention layer. For example, decoder 104 may include a multi-scale attention layer as the first cross-attention layer.

Figure 1C:
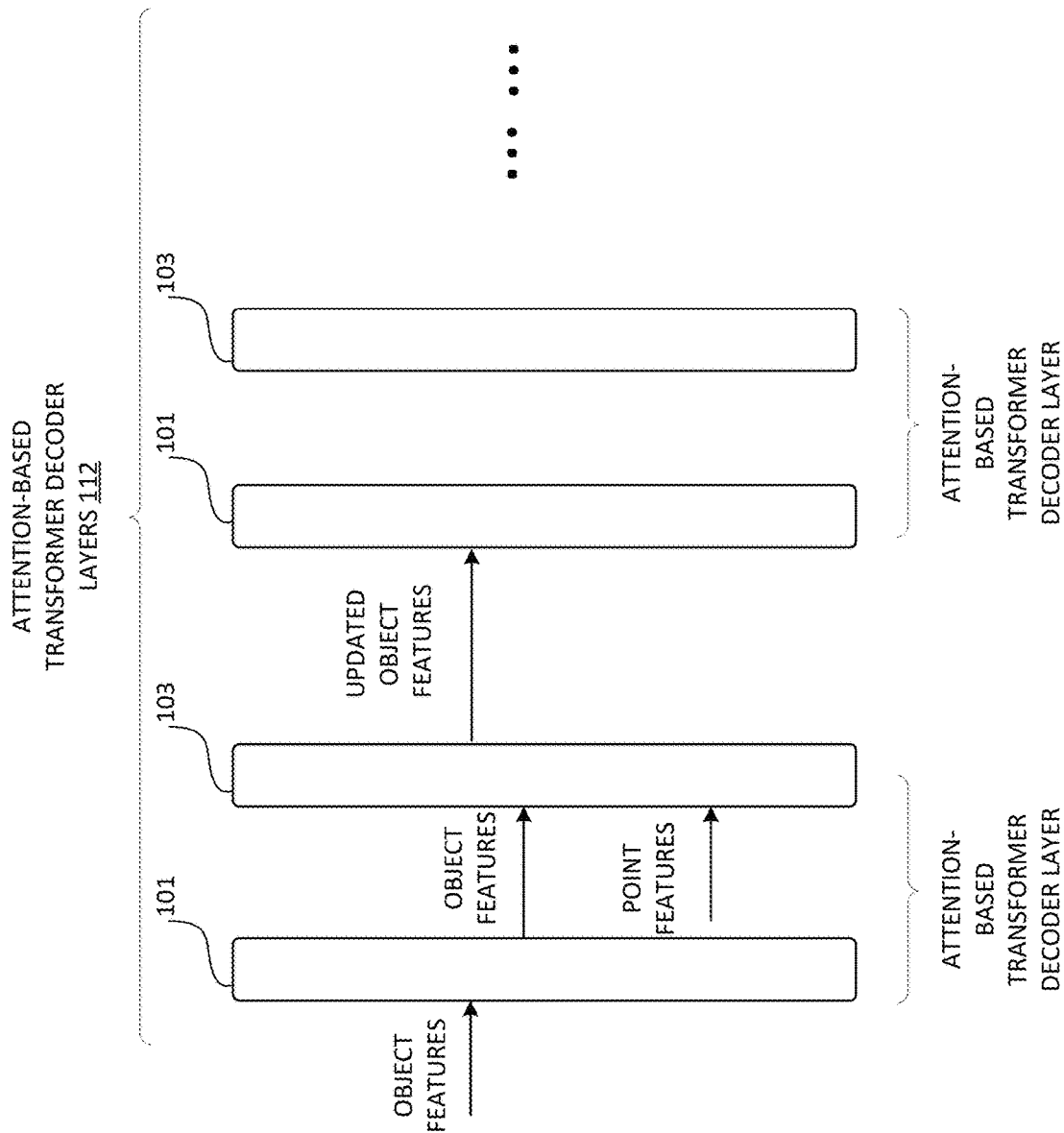
FIG. 1C illustrates another configuration of attention layers in the 3D object detection framework shown in FIG. 1A, according to some embodiments.
Figure 1D:
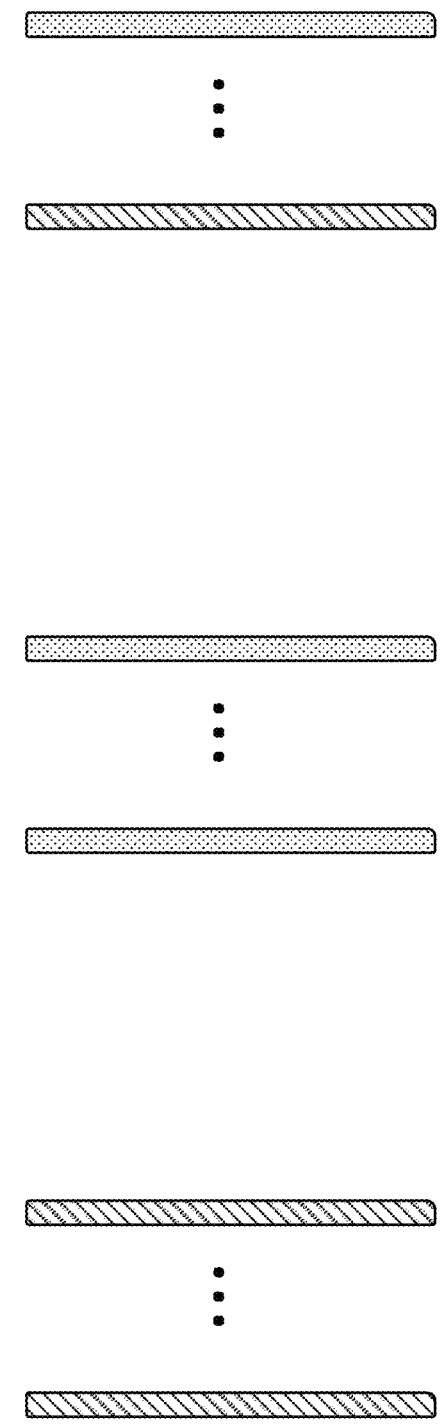
FIG. 1D illustrates exemplary cross-attention layers in the 3D object detection framework shown in FIG. 1A, according to some embodiments.

FIG. 1C illustrates a detailed diagram of another configuration of attention-based transformer decoder layers 112 shown in FIG. 1A. Different from the configuration in FIG. 1B, in FIG. 1C, each attention-based transformer decoder layer includes a self-attention layer 101 followed by a cross-attention layer 103. The self-attention layer 101 and the cross-attention layer 103 may be coupled in cascade. The input of each self-attention layer 101 may be a set of object features and the output may be a set of updated object features. The input of each cross-attention layer 103 includes a set of object features (e.g., from the output of the respective self-attention layer 101) and a set of point features, and the output of cross-attention layer 103 includes updated object features, which is fed into the next self-attention layer 101 (e.g., in the next attention-based transformer decoder layer) as input. In some embodiments, the point features, as part of the input of cross-attention layer 103, may be the point feature in output 118.

In various embodiments, the cross-attention layer 103 may include a multi-scale attention layers, and/or one or more of size-adaptive local attention layers. In some embodiments, cross-attention layer 103 include a multi-scale attention layer or a size-adaptive local attention layer. The multi-scale attention layer and the size-adaptive local attention layer may be similar to those described in FIG. 1B, and the details of the two attention layers are described in FIGS. 2 and 3. Referring back to FIG. 1D, the cross-attention layers 103 in attention-based transformer decoder layers 112 may include (a) all (e.g., only) multi-scale attention layers, (b) all size-adaptive local attention layers, or (c) a combination of multi-scale attention layers and size-adaptive local attention layers. For ease of illustration, self-attention layers 101 are now shown in FIG. 1D for this configuration, e.g., each multi-scale attention layer and each size-adaptive location attention layer represents the cross-attention layer in a respective attention-based transformer decoder layer.

In an embodiment, decode 104 may include a size-adaptive local attention as the last cross-attention layer and one or more multi-scale attentions before the size-adaptive local attention layer. For example, decoder 104 may include a multi-scale attention layer as the first cross-attention layer. In some embodiments, each of attention-based transformer decoder layers 112 includes a multi-scale attention layer or a self-adaptive local attention layer. In some embodiments, only the first attention-based transformer decoder layer includes a multi-scale attention layer, and the last attention-based transformer decoder layer includes a size-adaptive local attention layer, and the attention-based transformer decode layers in between each does not include the multi-scale attention layer or the size-adaptive local attention layer. The specific arrangement of the multi-scale attention layers and the size-adaptive local attention layer can be flexibly determined based on the design of 3D object detection framework 100, and should not be limited by the embodiments of the present disclosure.

Figure 2:
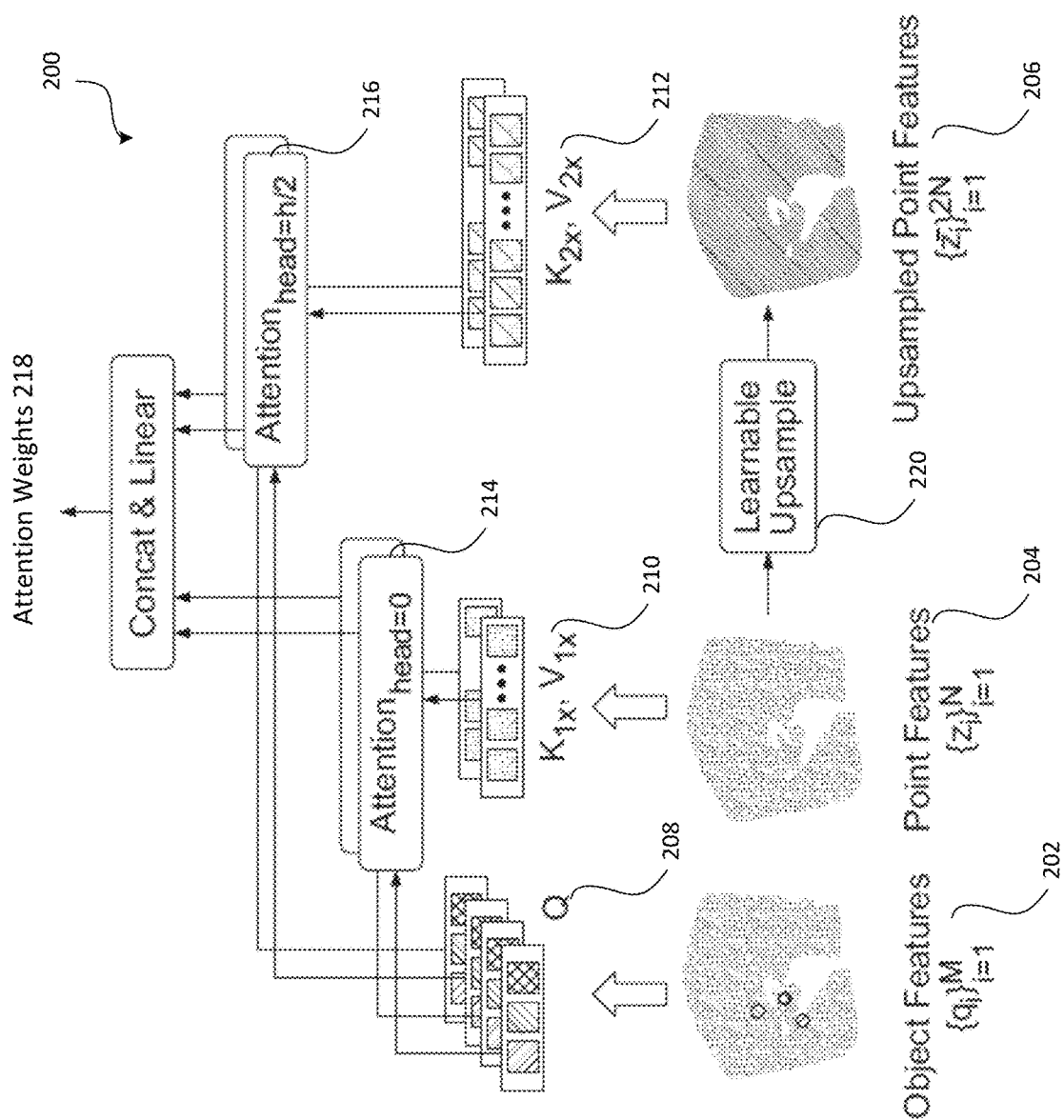
FIG. 2 illustrates an exemplary hierarchical attention mechanism in the cross-attention layers in a 3D object detection framework, according to some embodiments.

FIG. 2 illustrates the attention mechanism of a multi-scale attention layer 200, according to some embodiments. Multi-scale attention layer 200 may be an example of the multi-scale attention layer illustrated in FIGS. 1B-1D. Multi-scale attention layer 200 may receive object features 202 (i.e., $\{q_i\}_{i=1}^M$) and point features 204 (i.e., $\{z_i\}_{i=1}^N$) as input. Object features 202 may be an output from another attention layer immediately before the multi-scale attention layer. For example, the other attention layer may be a self-attention layer or another cross-attention layer. In an embodiment, the other attention layer is another multi-scale attention layer. Point features 204 may be part of the output (i.e., 118) from the encoder (i.e., 102), and may be considered as a single-scale input. Multi-scale attention layer 200 may compute the query (Q) 208 using object features 202.

Multi-scale attention layer 200 may generate a higher-resolution feature map from the single-scale input. Multi-scale attention layer 200 may first upsample the coordinates of a plurality of points from the raw point data raw point data (e.g., $\mathcal{P} = \{p_i\}_{i=1}^P$) The number of upsampled points may be greater than N. In some embodiments, the number of upsampled points is 2N and is denoted as $\{p_i\}_{i=1}^{2N}$. A suitable upsampling operation, e.g., a learnable upsampling operation 220, may be performed to upsample the coordinates of the 2N points from the raw point data. In some embodiments, FPS is used for the upsampling operation.

Multi-scale attention layer 200 may then generate point features for the upsampled (e.g., 2N) points. For example, for the set of 2N upsampled points, the set of upsampled features are represented as $\{\tilde{z}_i\}_{i=1}^{2N}$. For each upsampled point $p_i$, multi-scale attention layer 200 may search for the top three of its nearest neighboring points in the Euclidean distance in the input feature map $\{z_i\}_{i=1}^N$. The point features of the top three neighboring points may be denoted as $\{z_i^0, z_i^1, z_i^2\}$. Multi-scale attention layer 200 may then compute a weighted interpolation of the three point features, weighted by the inverse of their Euclidean distances to the upsampled point $p_i$. Multi-scale attention layer 200 may then project the interpolated feature into the feature representation of the upsampled point $p_i$. Multi-scale attention layer 200 may then obtain the set of upsampled features 206 (e.g., an upsampled feature map) as:

$$\{\tilde{z}_i\}_{i=1}^{2N}, \tilde{z}_i = \Phi_\theta(\text{interpolate}(\{\{z_i^0, z_i^1, z_i^2\}\})) \quad (3)$$

where $\Phi_\theta$ is the learnable projection function parameterized by $\theta$. In some embodiments, a suitable projection layer, such as a multilayer perceptron (MLP), is used for the feature projection.

Multi-scale attention layer 200 may then obtain two sets of point features (e.g., of different scales), i.e., $\{z_i\}_{i=1}^N$, $\{\tilde{z}_i\}_{i=1}^{2N}$. Multi-scale attention layer 200 may respectively compute the key (K) and value (V) for the sets of point features $\{z_i\}_{i=1}^N$ and $\{\tilde{z}_i\}_{i=1}^{2N}$. The computed K's and V's for the set of point features 204 ($\{z_i\}_{i=1}^N$) are denoted as $K_{1x}$, $V_{1x}$ 210, and the computed K's and V's for the set of upsampled point features 206 ($\{\tilde{z}_i\}_{i=1}^{2N}$) are denoted as $K_{2x}$, $V_{2x}$ 212. Multi-scale attention layer 200 may perform cross-attention between $K_{1x}$, $V_{1x}$ 210 and Q 208 using a first portion of attention heads 214, and perform cross-attention between $K_{2x}$, $V_{2x}$ 212 and Q 208 using a second portion of attention heads 216. In some embodiments, the first portion of attention heads 214 has half of all the multi-head attention heads of multi-scale attention layer 200, and the second portion of attention heads 216 has the other half of all the multi-head attention heads of multi-scale attention layer 200. The attention functions are applied in parallel in each attention head. The output of first portion of attention heads 214 may be one or more first attention weights, and the output of the second portion of attention heads 216 may be one or more second attention weights. Multi-scale attention layer 200 may then perform concatenation and/or linearization on the first attention weight(s) and the second attention weight(s) to obtain a set of attention weights 218. In some embodiments, multi-scale attention layer 200 apply the set of attention weights 218 on object features 202 to update the object features for the next cross-attention layer. In some embodiments, the output of multi-scale attention layer 200 includes the updated object features.

Figure 3:
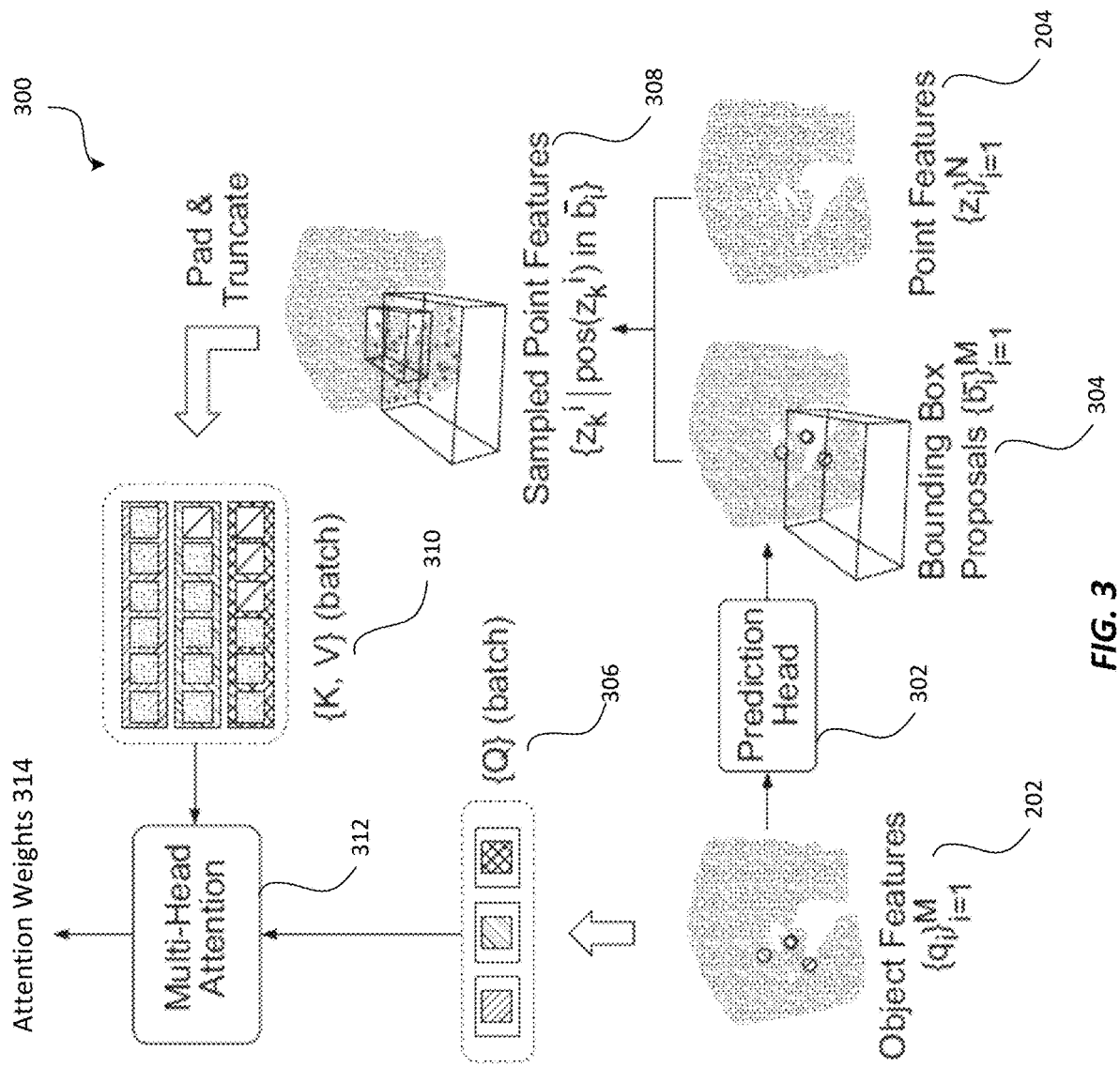
FIG. 3 illustrates another exemplary hierarchical attention mechanism in the cross-attention layers in a 3D object detection framework, according to some embodiments.

FIG. 3 illustrates the attention mechanism of a size-adaptive local attention layer 300, according to some embodiments. Size-adaptive local attention layer 300 may be an example of the size-adaptive local attention layer illustrated in FIGS. 1B-1D. Size-adaptive local attention layer 300 may receive object features 202 (i.e., $\{q_i\}_{i=1}^M$) and point features 204 (i.e., $\{z_i\}_{i=1}^N$) as input. Object features 202 may be an output from another attention layer immediately before the multi-scale attention layer. For example, the other attention layer may be a self-attention layer or another cross-attention layer. In an embodiment, the other attention layer is another multi-scale attention layer. Point features 204 may be part of the output (i.e., 118) from the encoder (i.e., 102). Size-adaptive local attention layer 300 may compute the query (Q) using object features 202. For example, the Q for an object candidate for the cross-attention layer l is computed as $Q_i^l = q_i^l W^Q$, $W^Q \in \mathbb{R}^{d \times d_h}$ being the parameter matrix and $q_i^l$ being the object candidate in the input of layer l.

Size-adaptive local attention layer 300 may generate intermediate bounding box proposals 304 represented as $\{\hat{b}_i\}_{i=1}^M$ based on the set of object features 202 ($\{q_i\}_{i=1}^M$). A prediction head 302 of size-adaptive local attention layer 300 may be used to generate the intermediate bounding box proposals 304, which are bounding box proposals determined to represent the objects in the scene using the currently received object features 202. Size-adaptive local attention layer 300 may obtain candidate points in the intermediate bounding box proposals $\{\hat{b}_i\}_{i=1}^M$, and may perform cross-attention between the set of object features 202 of each object candidate $q_i$ and the candidate points obtained in the intermediate bounding box proposals 304 ($\{\hat{b}_i\}_{i=1}^M$). Size-adaptive local attention layer 300 may then determine/sample, from the set of point features 204 ($\{z_i\}_{i=1}^N$)), a set of sampled point features 308 $\{z_k^i | \text{pos}(z_k^i)$ in $b_i\}$ that belong to the intermediate bounding box proposal 304 based on the cross-attention.

Size-adaptive local attention layer 300 may then obtain a batch of $\{K, V\}$ of sampled point features 308. Size-adaptive local attention layer 300 may determine the K and V for each object candidate $q_i^l$. To allow batch computation, size-adaptive local attention layer 300 may determine a maximum number of points ($N_{local}$) for the sampling process (e.g., to obtain sampled point features 308) and use $N_{local}$ as a fixed token length for each query point. Size-adaptive local attention layer 300 may process the K's and V's of sampled point features 308 to have the same token length through padding and/or truncating tokens. For example, for intermediate bounding box proposals 304 that contains less than $N_{local}$ points, size-adaptive local attention layer 300 may pad the point sequence with an unused token to $N_{local}$ and mask the unused tokens out the in the cross-section function. For intermediate bounding box proposals 304 that contains more than $N_{local}$ points, size-adaptive local attention layer 300 may randomly discard and/or truncate the sequence to have $N_{local}$ points as K's and V's. If the intermediate bounding boxes are empty, size-adaptive local attention layer 300 may perform ball query described by Charles Ruizhongtai Qi et al. (Pointnet: Deep Learning On Point Sets For 3D Classification And Segmentation, Charles Ruizhongtai Qi, Hao Su, Kaichun Mo, and Leonidas J. Guibas. In *CVPR*, 2017) around object candidates to sample $N_{local}$ points.

Size-adaptive local attention layer 300 may then perform cross-attention using multi-head attention layers 312 on a batch of Q 306 and a batch of {K, V} 310 (e.g., after the processing) to generate a set of attention weights 314. In some embodiments, multi-scale attention layer 200 apply the set of attention weights 314 on object features 202 to update the object features for the next cross-attention layer. In some embodiments, the output of size-adaptive local attention layer 300 includes the updated object features. Size-adaptive local attention layer 300 may compute the cross-attention at multi-head attention layers 312 and update each object candidate $q_i^l \in \mathbb{R}^d$ (e.g., input) at output as:

$$q_i^{l+1} = \text{Attn}(Q_i^l, K_i^l, V_i^l) \tag{3}$$

where $Q_i^l = q_i^l W^Q$, $K_i^l = Z_i W^K$, $V_i^l = Z_i W^V$ with $Z_i = \{z_k^i | \text{pos}(z_k^i) \text{ in } \hat{b}_i\}$, $\hat{b}_i = \text{Pred}_{box}^l(q_i^l)$. In the above equations, pos(•) denotes the coordinate of a point in the 3D space, $Z_i$ is a set of points inside box $\hat{b}_i$, and $\text{Pred}_{box}^l$ is the prediction head layer l that generates the intermediate box proposals 304.

Figure 4:
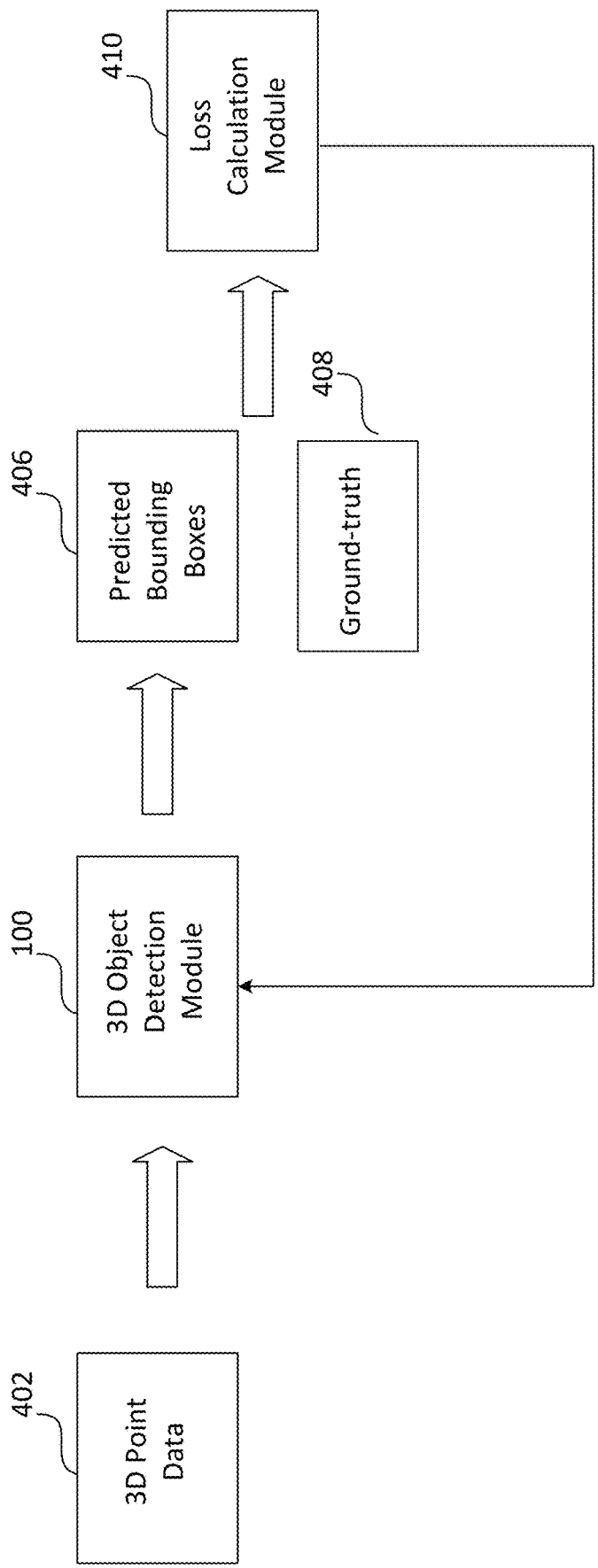
FIG. 4 illustrates a training process of a 3D object detection module, according to some embodiments.

FIG. 4 illustrates the training of 3D object detection framework 100, according to some embodiments. In some embodiments, 3D object detection framework 100 includes a neural-network based model. Ground-truth 408 may include a plurality of bounding boxes representing the objects in a scene.

As shown in FIG. 4, for the training of 3D object detection framework 100, 3D object detection framework 100 may receive the training data as input, which may be a set of 3D point data 402 (e.g., similar to 116) that include the 3-dimensional coordinates of a plurality of points in a 3D space/scene. 3D object detection framework 100 may generate one or more predicted bounding boxes 406 using attention mechanism (e.g., referring to the description of FIGS. 1A-1D, 2, and 3). Loss calculation module 410 may calculate a cross-entropy loss based on the difference between the predicted token (e.g., word token) distribution of predicted bounding boxes 406 and the token distribution of ground-truth 408. The computed cross-entropy loss is then used to update to 3D object detection framework 100 by backpropagation. In this way, the probability of P(Ground-truth 408 | 3D point data 402) is maximized through the training of 3D object detection framework 100.

Example Work Flows

Figure 5:
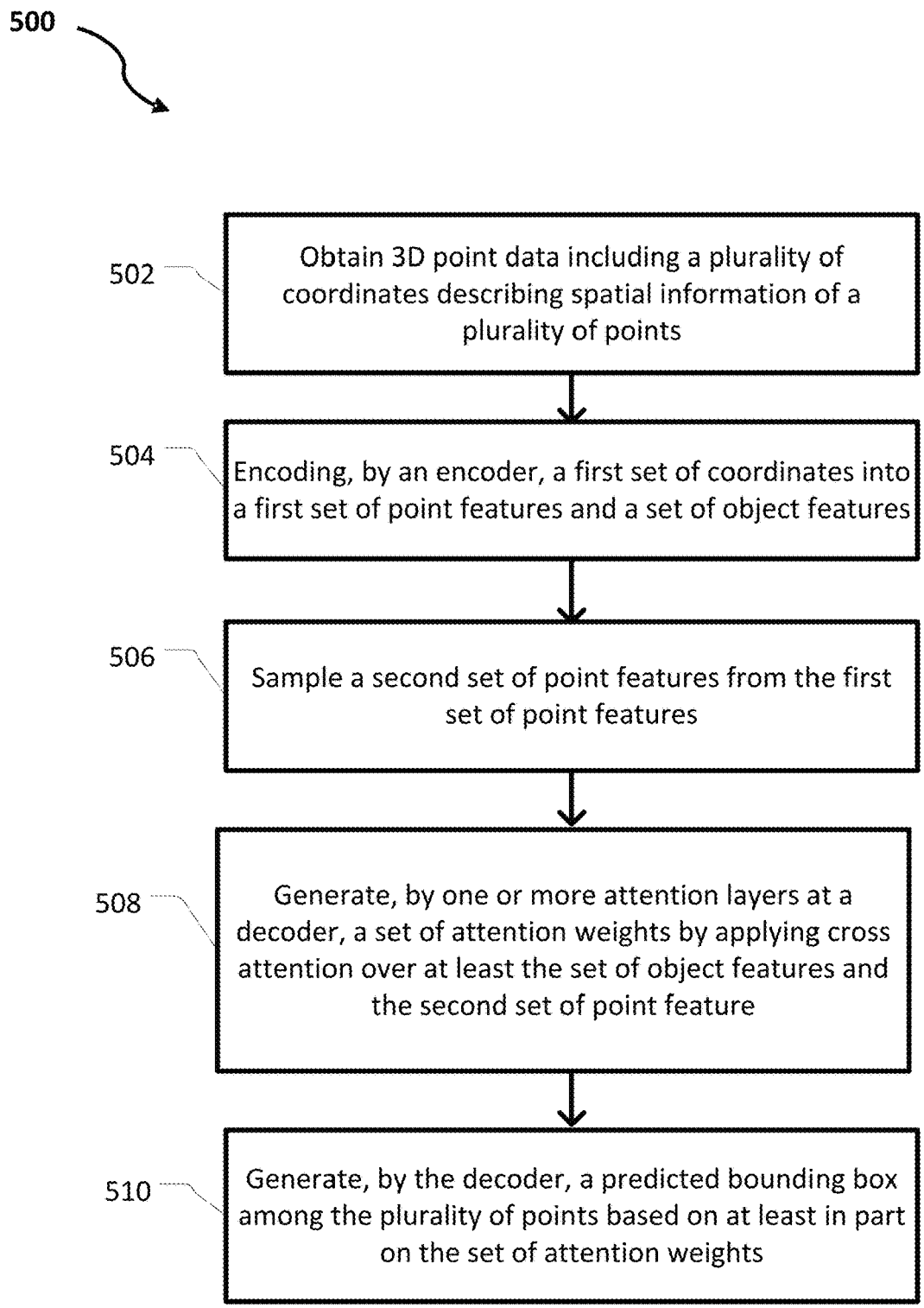
FIG. 5 is a flowchart illustrating a method for 3D object detection using a 3D object detection framework, according to some embodiments.

FIG. 5 is an example logic flow diagram illustrating a method of 3D object detection based on the framework shown in FIGS. 1A-1D, 2-4, and 8A-8G, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of the 3D object detection module 630 (e.g., FIGS. 6 and 7) that performs 3D object detection using 3D point data.

As illustrated, the method 500 includes a number of enumerated steps, but aspects of the method 500 may include additional steps before, after, and in between the enumerated steps. In some aspects, one or more of the enumerated steps may be omitted or performed in a different order.

Figure 6:
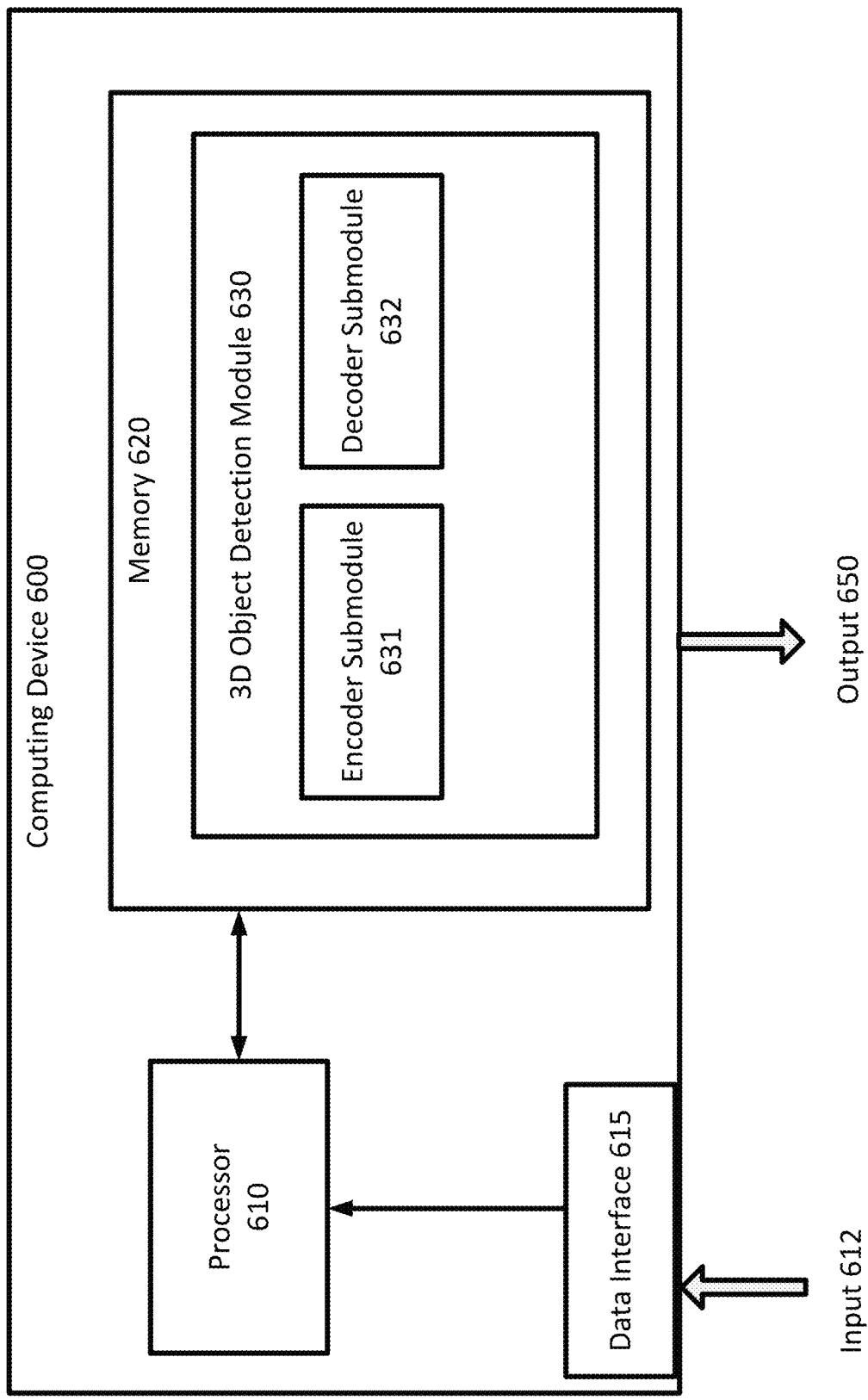
FIG. 6 is a simplified diagram illustrating a computing device implementing the 3D object detection framework described in FIGS. 1A-1D, and 2-5, according to one embodiment described herein.
Figure 7:
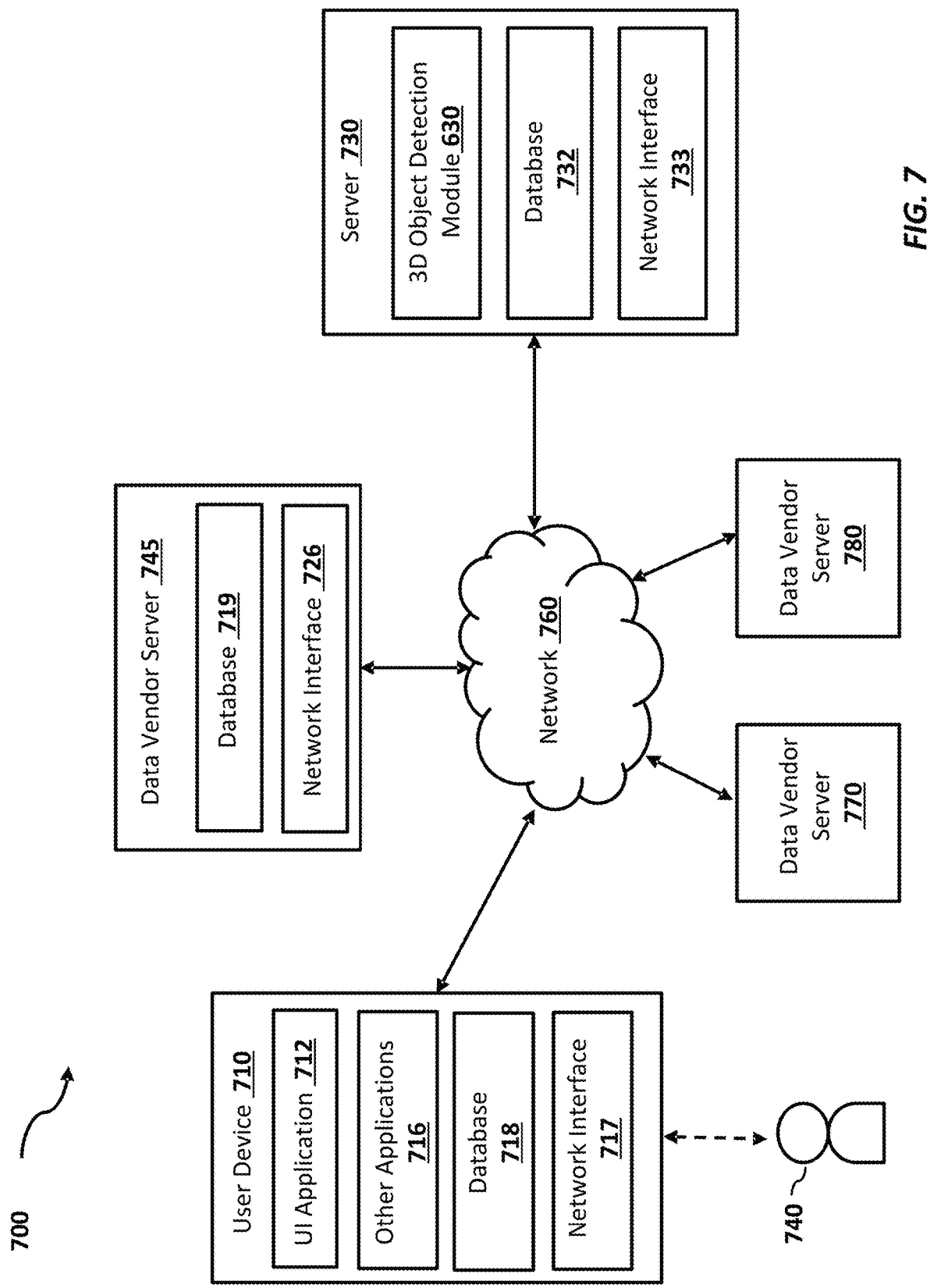
FIG. 7 is a simplified block diagram of a networked system suitable for implementing the 3D object detection framework described in FIGS. 1A-1D, and 2-5 and other embodiments described herein.

At step 502, 3D point data (e.g., similar to 116 in FIG. 1A) including a plurality of coordinates describing spatial information of a plurality of points is obtained, e.g., via a communication interface (e.g., data interface 615 in FIG. 6, or network interface 733 in FIG. 7).

At step 504, the encoder (e.g., similar to 102 in FIG. 1A) encodes a first set of coordinates into a first set of point features (e.g., similar to 118 in FIG. 1A, and 204 in FIGS. 2 and 3) and a set of object features (e.g., similar to 118 in FIG. 1A, and 202 in FIGS. 2 and 3).

At step 506, a second set of point features (e.g., similar to 206 in FIG. 2, and 308 in FIG. 3) is sampled from the first set of point features. In some embodiments, as illustrated in FIG. 2, the second set of point features are obtained by upsampling (e.g., similar to the learnable upsampling operation 220 in FIG. 2) the first set of coordinates into a second set of coordinates that contains more sample points than the first set of coordinates. A respective subset of nearest neighbors from the first set of point features for each sample point in the second set of coordinates is determined, and a corresponding point feature for the respective sample point based on an interpolation of the respective subset of nearest neighbors is computed. In some embodiments, the second set of coordinates contains at least twice a number of sampled points than the first set of coordinates. In some embodiments, the determining of the second set of point features includes, determining three nearest neighbor points of each sampled point in the second set of coordinates by the encoder, and determining point features of the three nearest neighbor points in the first set of point features by the encode. A weighted interpolation of the point features of the three nearest neighbor points is performed by the encoder, and the interpolated point feature is projected into a feature representation of each sampled point in the second set of coordinates by the encoder. In some embodiments, the weighted interpolation includes weighting each of the point features of the three nearest neighbor points by an inverse of the respective Euclidean distance to each sampled point in the second set of coordinates.

In some embodiments, as illustrated in FIG. 3, the second set of point features are obtained by predicting (e.g., using a prediction head similar to 302) an intermediate bounding box proposal (e.g., similar to 304 in FIG. 3) based on the set of object features by a decoder (e.g., similar to 104 in FIG. 1A), and performing cross-attention between the set of object features and candidate points in the intermediate bounding box proposal. A sampled point feature (e.g., similar to 308 in FIG. 3) that belongs to the intermediate bounding box proposal is determined from the first set of point features based on the cross-attention.

At step 508, one or more attention layers (e.g., similar to 103 in FIG. 1B, 214 and 216 in FIG. 2, and 312 in FIG. 3) at the decoder generate a set of attention weights (e.g., similar to 218 in FIG. 2, and 314 in FIG. 3) by applying cross-attention over at least the set of object features and the second set of point feature.

In some embodiments, as illustrated in FIG. 2, the generating of the set of attention weights includes generating a first attention weight using the first set of point features and the set of object features, generating a second attention weight using the second set of point features and the set of object features, and concatenating the first attention weight and the second attention weight to form the set of attention weights. In some embodiments, as illustrated in FIG. 3, the set of attention weights are obtained by performing multi-head attention between a batch of object features from the set of object features and a batch of point features from the second set of point features. In some embodiments, the batch of point features are obtained by processing the second set of point features to have a same token length through padding or truncating tokens.

At step 510, the decoder generates a predicted bounding box (120) among the plurality of points based on at least in part on the set of attention weights.

Computer and Network Environment

FIG. 6 is a simplified diagram illustrating a computing device implementing the 3D object detection framework 100 described in FIGS. 1A-1D and 2-5, according to one embodiment described herein. As shown in FIG. 6, computing device 600 includes a processor 610 coupled to memory 620. Operation of computing device 600 is controlled by processor 610. And although computing device 600 is shown with only one processor 610, it is understood that processor 610 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 600. Computing device 600 may be implemented as a stand-alone subsystem, as a board added to a computing device, and/or as a virtual machine.

Memory 620 may be used to store software executed by computing device 600 and/or one or more data structures used during operation of computing device 600. Memory 620 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 610 and/or memory 620 may be arranged in any suitable physical arrangement. In some embodiments, processor 610 and/or memory 620 may be implemented on a same board, in a same package (e.g., system-in-package), on a same chip (e.g., system-on-chip), and/or the like. In some embodiments, processor 610 and/or memory 620 may include distributed, virtualized, and/or containerized computing resources. Consistent with such embodiments, processor 610 and/or memory 620 may be located in one or more data centers and/or cloud computing facilities.

In some examples, memory 620 may include non-transitory, tangible, machine readable media that includes executable code that when run by one or more processors (e.g., processor 610) may cause the one or more processors to perform the methods described in further detail herein. For example, as shown, memory 620 includes instructions for 3D object detection module 630 that may be used to implement and/or emulate the systems and models, and/or to implement any of the methods described further herein. 3D object detection module 630 may receive input 640 such as an input training data (e.g., 3D point data) via the data interface 615 and generate an output 650 which may be predicted bounding boxes. Examples of the input data may include 3D point data that includes the 3-dimensional coordinates of a plurality of points in the 3D space. Examples of the output data may include predicted bounding boxes to represent objects in a scene represented by the 3D point data in the input.

The data interface 615 may comprise a communication interface, a user interface (such as a voice input interface, a graphical user interface, and/or the like). For example, the computing device 600 may receive the input 640 (such as a training dataset) from a networked database via a communication interface. Or the computing device 600 may receive the input 640, such as the 3D point data, from a user via the user interface.

In some embodiments, the 3D object detection module 630 is configured to predict the parameters of bounding boxes (e.g., centers, shapes, sizes, and/or orientations) that represent objects in a scene, using a set of attention weights. The 3D object detection module 630 may further include an encoder submodule 631 (e.g., similar to encoder 102 in FIG. 1A) and a decoder submodule 632 (e.g., similar to decoder 104 in FIG. 1A).

In one embodiment, the 3D object detection module 630 and its submodules 631 and 632 may be implemented by hardware, software and/or a combination thereof.

In one embodiment, the 3D object detection module 630 and one or more of its submodules 631 and 632 may be implemented via an artificial neural network. The neural network comprises a computing system that is built on a collection of connected units or nodes, referred as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 620 as a structure of layers of neurons, and parameters describing the non-linear transformation at each neuron and the weights associated with edges connecting the neurons. An example neural network may be a transformer, e.g., RepSurf-U by Haoxi Ran et al. (Surface representation for point clouds. In CVPR, 2022, Haoxi Ran, Jun Liu, and Chengjie Wang) with one or more cross-attention layers in the decoder replaced by the disclosed cross-attention layer(s), and/or the like.

In one embodiment, the neural network based 3D object detection module 630 and one or more of its submodules 631 and 632 may be trained by updating the underlying parameters of the neural network based on the loss described in relation to FIG. 4. For example, the loss is a metric that evaluates how far away a neural network model generates a predicted output value from its target output value (also referred to as the "ground-truth" value). Given the loss computed, the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to its target output value.

Some examples of computing devices, such as computing device 600 may include non-transitory, tangible, machine readable media that include executable code that when run by one or more processors (e.g., processor 610) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIG. 7 is a simplified block diagram of a networked system suitable for implementing the 3D object detection framework 100 described in FIGS. 1A-1D and 2-5 and other embodiments described herein. In one embodiment, block diagram 700 shows a system including the user device 710 which may be operated by user 740, data vendor servers 745, 770 and 780, server 730, and other forms of devices, servers, and/or software components that operate to perform various methodologies in accordance with the described embodiments. Exemplary devices and servers may include device, stand-alone, and enterprise-class servers which may be similar to the computing device 600 described in FIG. 6, operating an OS such as a MICROSOFT® OS, a UNIX® OS, a LINUX® OS, or other suitable device and/or server-based OS. It can be appreciated that the devices and/or servers illustrated in FIG. 7 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 710, data vendor servers 745, 770 and 780, and the server 730 may communicate with each other over a network 760. User device 710 may be utilized by a user 740 (e.g., a driver, a system admin, etc.) to access the various features available for user device 710, which may include processes and/or applications associated with the server 730 to receive an output data anomaly report.

User device 710, data vendor server 745, and the server 730 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 700, and/or accessible over network 760.

User device 710 may be implemented as a communication device that may utilize appropriate hardware and software configured for wired and/or wireless communication with data vendor server 745 and/or the server 730. For example, in one embodiment, user device 710 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 710 of FIG. 7 contains a user interface (UI) application 712, and/or other applications 716, which may correspond to executable processes, procedures, and/or applications with associated hardware. For example, the user device 710 may receive a message indicating the predicted bounding boxes representing objects in a scene from the server 730 and display the message via the UI application 712. In other embodiments, user device 710 may include additional or different modules having specialized hardware and/or software as required.

In various embodiments, user device 710 includes other applications 716 as may be desired in particular embodiments to provide features to user device 710. For example, other applications 716 may include security applications for implementing client-side security features, programmatic client applications for interfacing with appropriate application programming interfaces (APIs) over network 760, or other types of applications. Other applications 716 may also include communication applications, such as email, texting, voice, social networking, and IM applications that allow a user to send and receive emails, calls, texts, and other notifications through network 760. For example, the other application 716 may be an email or instant messaging application that receives a prediction result message from the server 730. Other applications 716 may include device interfaces and other display modules that may receive input and/or output information. For example, other applications 716 may contain software programs for asset management, executable by a processor, including a graphical user interface (GUI) configured to provide an interface to the user 740 to view the predicted bounding boxes representing objects in a scene.

User device 710 may further include database 718 stored in a transitory and/or non-transitory memory of user device 710, which may store various applications and data and be utilized during execution of various modules of user device 710. Database 718 may store user profile relating to the user 740, predictions previously viewed or saved by the user 740, historical data received from the server 730, and/or the like. In some embodiments, database 718 may be local to user device 710. However, in other embodiments, database 718 may be external to user device 710 and accessible by user device 710, including cloud storage systems and/or databases that are accessible over network 760.

User device 710 includes at least one network interface component 717 adapted to communicate with data vendor server 745 and/or the server 730. In various embodiments, network interface component 717 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 745 may correspond to a server that hosts database 719 to provide training datasets including 3D point data to the server 730. The database 719 may be implemented by one or more relational database, distributed databases, cloud databases, and/or the like.

The data vendor server 745 includes at least one network interface component 726 adapted to communicate with user device 710 and/or the server 730. In various embodiments, network interface component 726 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 745 may send asset information from the database 719, via the network interface 726, to the server 730.

The server 730 may be housed with the 3D object detection module 630 and its submodules described in FIG.

6. In some implementations, 3D object detection module 630 may receive data from database 719 at the data vendor server 745 via the network 760 to generate attention weights and predicted bounding boxes. The generated attention weights and/or predicted bounding boxes may also be sent to the user device 710 for review by the user 740 via the network 760.

The database 732 may be stored in a transitory and/or non-transitory memory of the server 730. In one implementation, the database 732 may store data obtained from the data vendor server 745. In one implementation, the database 732 may store parameters of the 3D object detection module 630. In one implementation, the database 732 may store previously generated predicted bounding boxes, and the corresponding input feature vectors.

In some embodiments, database 732 may be local to the server 730. However, in other embodiments, database 732 may be external to the server 730 and accessible by the server 730, including cloud storage systems and/or databases that are accessible over network 760.

The server 730 includes at least one network interface component 733 adapted to communicate with user device 710 and/or data vendor servers 745, 770 or 780 over network 760. In various embodiments, network interface component 733 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 760 may be implemented as a single network or a combination of multiple networks. For example, in various embodiments, network 760 may include the Internet or one or more intranets, landline networks, wireless networks, and/or other appropriate types of networks. Thus, network 760 may correspond to small scale communication networks, such as a private or local area network, or a larger scale network, such as a wide area network or the Internet, accessible by the various components of system 700.

Example Results

FIGS. 8A-8G represent exemplary test results using embodiments described herein.

In this section, the disclosed method is first evaluated on two widely used indoor point cloud detection datasets, ScanNetV2 and SUN RGB-D. Next, qualitative and quantitative analyses of the method are provided, including visualizations of the bounding box predictions and attention weights, and evaluations using our proposed size-aware metrics. Lastly, ablation studies on the design choices of our attention modules are included.

ScanNetV2 (Scannet: Richly-Annotated 3D Reconstructions of Indoor Scenes, In *CVPR*, 2017, Angela Dai, Angel X. Chang, Manolis Savva, Maciej Halber, Thomas A. Funkhouser, and Matthias Niesner) consists of 1513 reconstructed meshes of hundreds of indoor scenes. It contains rich annotations for various 3D scene understanding tasks, including object classification, semantic segmentation, and object detection. For point cloud object detection, it provides axis-aligned bounding boxes with 18 object categories. The official dataset split is followed by using 1201 samples for training and 312 samples for testing. SUN RGB-D (SUN RGB-D: A RGB-D scene understanding benchmark suite. In *CVPR*, 2015, Shuran Song, Samuel P. Lichtenberg, and Jianxiong Xiao) is a single-view RGB-D dataset with 10335 samples. For 3D object detection, it provides oriented bounding box annotations with 37 object categories, while the standard evaluation protocol (Deep hough voting for 3d object detection in point clouds, In *ICCV*, 2019, Charles R. Qi, Or Litany, Kaiming He, and Leonidas J. Guibas.) is followed and only the 10 common categories are used. The training split contains 5285 samples and the testing set contains 5050 samples.

For both datasets, the standard evaluation protocol is followed and the mean Average Precision (mAP) is used as the evaluation metric. The mAP scores under two different Intersection over Union (IoU) thresholds are reported: mAP@0.25 and mAP@0.5. In addition, to evaluate model performance across different object sizes, the practice in 2D vision (Microsoft COCO: common objects in context. In *ECCV*, 2014, Tsung-Yi Lin, Michael Maire, Serge J. Belongie, James Hays, Pietro Perona, Deva Ramanan, Piotr Dollar, and C. Lawrence Zitnick) is followed, and the disclosed size-aware metrics that measure the mAP on small, medium, and large objects respectively, are implemented. On account of the randomness of point cloud training and inference, a model is trained 5 times and tested 5 times. It is reported that both the best and the average results among the 25 trials.

The disclosed method is validated by being applied to existing transformer point cloud detectors. Group-Free (Group-Free 3D Object Detection Via Transformers. In *ICCV*, 2021 Ze Liu, Zheng Zhang, Yue Cao, Han Hu, and Xin Tong) extracts features for object candidates using a transformer decoder with plain attention. Two configurations of Group-Free are included in the comparison: Group-Free$^{6,256}$ samples a total of 256 object candidates for feature learning and bounding box prediction, using a transformer decoder with 6 layers; Group-Free$^{12,512}$ is the largest configuration, which has 12 transformer layers and 512 object candidates. RepSurf-U (Surface Representation For Point Clouds. In *CVPR*, 2022, Haoxi Ran, Jun Liu, and Chengjie Wang.) proposes a novel multi-surface (umbrella curvature) representation of point clouds that can explicitly describe the local geometry. For object detection, RepSurf-U adopts the transformer decoder of Group-Free and replaces its backbone with one that extracts features on both point clouds and the surface representations. The official implementation and the averaged results of RepSurf-U for object detection are not publicly available, so the results of the disclosed implementation of RepSurf-U are included.

The performance of previous point-based 3D detectors is also included for comparison. VoteNet (Deep Hough Voting For 3D Object Detection In Point Clouds. In *ICCV*, 2019, Charles R. Qi, Or Litany, Kaiming He, and Leonidas J. Guibas) aggregates features for object candidates through end-to-end optimizable Hough Voting. H3DNet (Point transformer. In *ICCV*, 2021, Hengshuang Zhao, Li Jiang, Jiaya Jia, Philip H. S. Torr, and Vladlen Koltun) proposes a hybrid set of geometric primitives for object detection and trains multiple individual backbones for each primitive. 3DETR (An End-To-End Transformer Model For 3D Object Detection, In *ICCV*, 2021, Ishan Misra, Rohit Girdhar, and Armand Joulin) solves point cloud object detection as a set-to-set problem using a transformer encoder-decoder network. Pointformer (3D Object Detection With Pointformer. In *CVPR*, 2021 Xuran Pan, Zhuofan Xia, Shiji Song, Li Erran Li, and Gao Huang) proposes a hierarchical transformer-based point cloud back-bone and adopts the voting algorithm of VoteNet for object detection.

For a baseline model with L transformer layers, multi-scale feature learning is enabled by replacing the cross-attention of the 1-st layer with MS-A (e.g., multi-scale attention). After the L-th layer, an additional transformer layer is appended to perform local feature aggregation, which consists of Local-A (e.g., size-adaptive local attention) and a feedforward layer. The original training settings of the baseline models (Group-Free 3D Object Detection Via Transformers, In *ICCV*, 2021, Ze Liu, Zheng Zhang, Yue Cao, Han Hu, and Xin Tong.; Surface representation for point clouds, In *CVPR*, 2022, Haoxi Ran, Jun Liu, and Chengjie Wang) was followed.

As shown in FIG. 8A, on ScanNetV2, consistent improvements are observed in point cloud transformer detectors when equipped with the disclosed attention modules. By applying MS-A and Local-A to Group-Free, on-par performance with the state-of-the-art RepSurf-U detector is achieved. In addition, RepSurf-U can be further improved by over 1% in mAP@0.25 and over 2% in mAP@0.50 on varying model configurations. FIG. 8B shows a similar trend on SUN RGB-D, where the disclosed attention modules boost the mAP@0.50 of group-Free to sur-pass RepSurf-U, and can further improve the state-of-the-art method by 0.5% in mAP@0.25 and 1.8% in mAP@0.50.

Figure 8E:

As shown in FIG. 8E, qualitative results on both datasets are provided. The visualized results are of the disclosed methods applied to the Group-Free detectors. The qualitative results suggest that the disclosed model is able to detect and classify objects of different scales even in complex scenarios containing more than 10 objects (e.g., the example in the bottom row). By looking into cross-attention weights in the transformer detector, it is found that object candidates tend to have higher correlations with points that belong to their corresponding objects.

In addition to the standard evaluation metrics, models' performance across different object sizes is examined. Inspired by the size-aware metrics in 2D detection (Microsoft COCO: common objects in context. In *ECCV*, 2014, Tsung-Yi Lin, Michael Maire, Serge J. Belongie, James Hays, Pietro Perona, Deva Ramanan, Piotr Dollar, and C. Lawrence Zitnick.), the disclosed size-aware metrics for 3D detection is implemented. The analysis is conducted on Scan-NetV2, on which the volume for all the objects in all samples is calculated. The threshold for $mAP_S$ is set as the 30th percentile of the volume of all objects, and the 70th percentile is used as the threshold for $mAP_L$.

As shown in FIG. 8C, the disclosed methods are applied using size-aware metrics. The average result over 25 trials is reported. The first row denotes the Group-Free[12,512] baseline. Firstly, by com-paring the $mAP_S$ to $mAP_L$, it is noticed that it has imbalanced performance across different object sizes. The improvement margins suggest that the disclosed method has the most performance gain on small and medium-sized objects. The result suggests that hierarchical designs can aid fine-grained and localized feature learning for point cloud transformer detectors and helps models detect smaller objects.

An ablation study is first conducted on the stand-alone effects of the disclosed multi-scale attention and size-adaptive local attention. Next, empirical analyses of the design choices of our attention modules are included. If not otherwise specified, experiments described herein are conducted on ScanNetV2 with the Group-Free[12,512] baseline. Without loss of generality, the results in this subsection are the averaged numbers over 25 trials.

FIG. 8D shows the stand-alone performance of the proposed attention modules. Compared to the plain attention baseline, both of the disclosed attentions are proved to be effective. When combined together, it is found that the two modules to be complementary to each other and bring more significant performance gain.

In Local-A, for each object candidate (i.e., query), a set of points are sampled within its corresponding bounding box proposal and the point features are used as the key and value for this object candidate in the cross-attention function. As previously described, the number of sampled points with $N_{local}$ is capped/limited to allow batch computation.

An empirical analysis of the effects of $N_{local}$ on Local-A is provided. From FIG. 8F, it is found that too little number of points (e.g., $N_{local}=8$) for Local-A results in a performance drop. On the other hand, as $N_{local}$ continues to increase, a significant performance gain is not observed compared to $N_{local}=16$. Intuitively, a small $N_{local}$ means the points within each bounding box are sampled sparsely, which can be too sparse to provide enough information about any object. This explains why $N_{local}=8$ does not work well. However, on the other hand, a large $N_{local}$ may only benefit large objects and has little effect on smaller objects, because the latter are padded with unused tokens.

Learnable upsampling is proposed earlier for MS-A to build higher-resolution point features from the single-scale input. In the same spirit, a parameterized downsampling procedure can be realized through conventional set abstraction (Pointnet: Deep Learning On Point Sets For 3D Classification And Segmentation. In *CVPR*, 2017, Charles Ruizhongtai Qi, Hao Su, Kaichun Mo, and Leonidas J. Guibas.), which aggregated point features within local groups and produce a feature map with fewer points (i.e., lower resolution). Intuitively, a higher point density of the feature map provides more fine-grained features. To study the effects of feature maps of different granularity, an empirical analysis is conducted on MS-A using different sets of multi-scale feature maps representing point clouds of varying granularity.

As shown in FIG. 8G, the performance of two multi-scale choices is examined in comparison with the single-scale baseline. The result suggests that coarse features (s=0.5×) do not benefit transformer detectors. This is expected because trans-formers do not have limited receptive fields and thus do not rely on a coarse-grained feature map to learn global context.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A system for three-dimensional (3D) object detection, the system comprising:
    an input interface configured to obtain 3D point data including a plurality of coordinates describing spatial information of a plurality of points;
    a memory storing a neural network based 3D object detection model comprising an encoder and a decoder, and a plurality of processor-executable instructions; and
    one or more processors executing the plurality of processor-executable instructions to perform operations comprising:
    encoding, by the encoder, a first set of coordinates into a first set of point features and a set of object features;
    sampling a second set of point features from the first set of point features, wherein the second set of point features are obtained by:
        upsampling the first set of coordinates into a second set of coordinates that contains more sample points than the first set of coordinates;
        determining, for each sampled point in the second set of coordinates, a respective subset of nearest neighbors from the first set of point features; and
        computing a corresponding point feature for the each sampled point in the second set of coordinates based on an interpolation of the respective subset of nearest neighbors;
    generating, by one or more attention layers at the decoder, a set of attention weights by applying cross-attention over at least the set of object features and the second set of point feature, and
    generate, by the decoder, a predicted bounding box among the plurality of points based on at least in part on the set of attention weights.

2. The system of claim 1, wherein the determining of the second set of point features comprises:
    determining, by the encoder, three nearest neighbor points of the each sampled point in the second set of coordinates;
    determining, by the encoder, point features of the three nearest neighbor points in the first set of point features;
    performing, by the encoder, a weighted interpolation of the point features of the three nearest neighbor points; and
    projecting, by the encoder, the interpolated point feature into a feature representation of the each sampled point in the second set of coordinates.

3. The system of claim 2, wherein the weighted interpolation comprises weighting each of the point features of the three nearest neighbor points by an inverse of the respective Euclidean distance to the each sampled point in the second set of coordinates.

4. The system of claim 1, wherein the generating of the set of attention weights comprises:
    generating a first attention weight using the first set of point features and the set of object features;
    generating a second attention weight using the second set of point features and the set of object features; and
    concatenating the first attention weight and the second attention weight to form the set of attention weights.

5. The system of claim 1, wherein the second set of coordinates contains at least twice a number of sampled points than the first set of coordinates.

6. The system of claim 1, wherein the second set of point features are obtained by:
    predicting, by the decoder, an intermediate bounding box proposal based on the set of object features;
    performing cross-attention between the set of object features and candidate points in the intermediate bounding box proposal; and
    determining, from the first set of point features, a sampled point feature that belongs to the intermediate bounding box proposal based on the cross-attention.

7. The system of claim 6, wherein the set of attention weights are obtained by:
    performing multi-head attention between a batch of object features from the set of object features and a batch of point features from the second set of point features.

8. The system of claim 7, wherein the batch of point features are obtained by processing the second set of point features to have a same token length through padding or truncating tokens.

9. A method of three-dimensional (3D) object detection, the method comprising:
    receiving, via a data interface, 3D point data including a plurality of coordinates describing spatial information of a plurality of points;
    encoding, by an encoder, a first set of coordinates into a first set of point features and a set of object features;
    sampling a second set of point features from the first set of point features, wherein the second set of point features are obtained by:
        upsampling the first set of coordinates into a second set of coordinates that contains more sample points than the first set of coordinates;
        determining, for each sampled point in the second set of coordinates, a respective subset of nearest neighbors from the first set of point features; and
        computing a corresponding point feature for the each sampled point in the second set of coordinates based on an interpolation of the respective subset of nearest neighbors;
    generating, by one or more attention layers at a decoder, a set of attention weights by applying cross-attention over at least the set of object features and the second set of point feature, and
    generate, by the decoder, a predicted bounding box among the plurality of points based on at least in part on the set of attention weights.

10. The method of claim 9, wherein the determining of the second set of point features comprises:
    determining, by the encoder, three nearest neighbor points of the each sampled point in the second set of coordinates;
    determining, by the encoder, point features of the three nearest neighbor points in the first set of point features;
    performing, by the encoder, a weighted interpolation of the point features of the three nearest neighbor points; and projecting, by the encoder, the interpolated point feature into a feature representation of the each sampled point in the second set of coordinates.

11. The method of claim 10, wherein the performing of the weighted interpolation comprises weighting each of the point features of the three nearest neighbor points by an inverse of the respective Euclidean distance to the each sampled point in the second set of coordinates.

12. The method of claim 9, wherein the generating of the set of attention weights comprises:
   generating a first attention weight using the first set of point features and the set of object features;
   generating a second attention weight using the second set of point features and the set of object features; and
   concatenating the first attention weight and the second attention weight to form the set of attention weights.

13. The method of claim 9, wherein the second set of coordinates contains at least twice a number of sampled points than the first set of coordinates.

14. The method of claim 9, wherein the second set of point features are obtained by:
   predicting, by the decoder, an intermediate bounding box proposal based on the set of object features;
   performing cross-attention between the set of object features and candidate points in the intermediate bounding box proposal; and
   determining, from the first set of point features, a sampled point feature that belongs to the intermediate bounding box proposal based on the cross-attention.

15. The method of claim 14, wherein the set of attention weights are obtained by:
   performing multi-head attention between a batch of object features from the set of object features and a batch of point features from the second set of point features.

16. The method of claim 15, wherein the batch of point features are obtained by processing the second set of point features to have a same token length through padding or truncating tokens.

17. A non-transitory machine-readable medium comprising a plurality of machine-executable instructions which, when executed by one or more processors, are adapted to cause the one or more processors to perform operations comprising:
   receiving 3D point data including a plurality of coordinates describing spatial information of a plurality of points;
   encoding a first set of coordinates into a first set of point features and a set of object features;
   sampling a second set of point features from the first set of point features, wherein the second set of point features are obtained by:
      upsampling the first set of coordinates into a second set of coordinates that contains more sample points than the first set of coordinates;
      determining, for each sampled point in the second set of coordinates, a respective subset of nearest neighbors from the first set of point features; and
      computing a corresponding point feature for the each sampled point in the second set of coordinates based on an interpolation of the respective subset of nearest neighbors;
   generating a set of attention weights by applying cross-attention over at least the set of object features and the second set of point feature, and
   generate a predicted bounding box among the plurality of points based on at least in part on the set of attention weights.

18. The non-transitory machine-readable medium of claim 17, wherein the determining of the second set of point features comprises:
   determining, by the encoder, three nearest neighbor points of the each sampled point in the second set of coordinates;
   determining, by the encoder, point features of the three nearest neighbor points in the first set of point features;
   performing, by the encoder, a weighted interpolation of the point features of the three nearest neighbor points; and
   projecting, by the encoder, the interpolated point feature into a feature representation of the each sampled point in the second set of coordinates.

19. The non-transitory machine-readable medium of claim 18, wherein the weighted interpolation comprises weighting each of the point features of the three nearest neighbor points by an inverse of the respective Euclidean distance to the each sampled point in the second set of coordinates.

20. The non-transitory machine-readable medium of claim 17, wherein the generating of the set of attention weights comprises:
   generating a first attention weight using the first set of point features and the set of object features;
   generating a second attention weight using the second set of point features and the set of object features; and
   concatenating the first attention weight and the second attention weight to form the set of attention weights.

* * * * *